(12) United States Patent
Frenzel et al.

(10) Patent No.: US 7,612,332 B2
(45) Date of Patent: Nov. 3, 2009

(54) OPTICAL MODULE WITH INTEGRATED SOURCE OF LIGHT

(75) Inventors: Henryk Frenzel, Regensburg (DE); Harald Schmidt, Regensburg (DE)

(73) Assignee: Siemens VDO Automotive AG, Munich (DE)

( * ) Notice: Subject to any disclaimer, the term of this patent is extended or adjusted under 35 U.S.C. 154(b) by 72 days.

(21) Appl. No.: 11/912,984

(22) PCT Filed: Apr. 28, 2006

(86) PCT No.: PCT/EP2006/061936
§ 371 (c)(1), (2), (4) Date: Oct. 29, 2007

(87) PCT Pub. No.: WO2006/117346
PCT Pub. Date: Nov. 9, 2006

(65) Prior Publication Data
US 2008/0099700 A1 May 1, 2008

(30) Foreign Application Priority Data
Apr. 29, 2005 (DE) .................. 10 2005 020 138

(51) Int. Cl.
*H01J 40/14* (2006.01)
*H01J 5/02* (2006.01)
(52) U.S. Cl. .................. 250/239; 348/84; 348/241; 348/374

(58) Field of Classification Search .................. 250/239; 348/84, 241, 374
See application file for complete search history.

(56) References Cited

U.S. PATENT DOCUMENTS

| 6,621,065 B1 | 9/2003 | Fukumoto et al. |
| 6,831,679 B1 * | 12/2004 | Olsson et al. .................. 348/84 |
| 7,476,848 B2 * | 1/2009 | Argast et al. .................. 250/239 |
| 2003/0030180 A1 | 2/2003 | Meek et al. |
| 2005/0168617 A1 | 8/2005 | Timm et al. |

FOREIGN PATENT DOCUMENTS

| DE | 10057737 A1 | 6/2001 |
| DE | 10360762 A1 | 7/2005 |
| JP | 2003008954 A | 1/2003 |
| WO | 03105465 A1 | 12/2003 |

* cited by examiner

*Primary Examiner*—Seung C Sohn
(74) *Attorney, Agent, or Firm*—Laurence A. Greenberg; Werner H. Stemer; Ralph E. Locher

(57) ABSTRACT

An optical module includes a lens arrangement which is used to project electromagnetic radiation to a semiconductor element and a light source disposed in the surrounding area of the radiation inlet area of the lens arrangement. The lens arrangement and the light source are provided with a covering which is permeable to electromagnetic radiation. The covering is provided with a radiation barrier that blocks the radiation which is emitted by the light source and prevents a direct injection of radiation which is emitted by the light source into the lens arrangement.

14 Claims, 2 Drawing Sheets

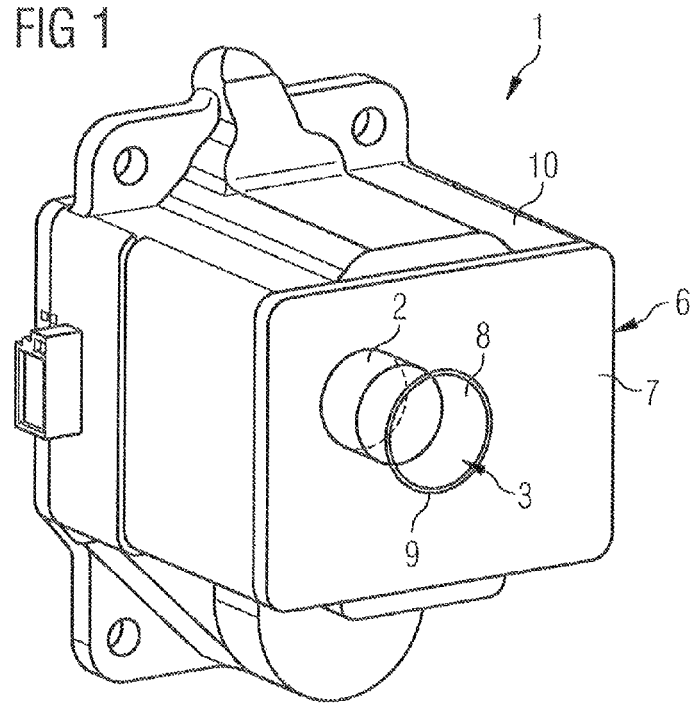
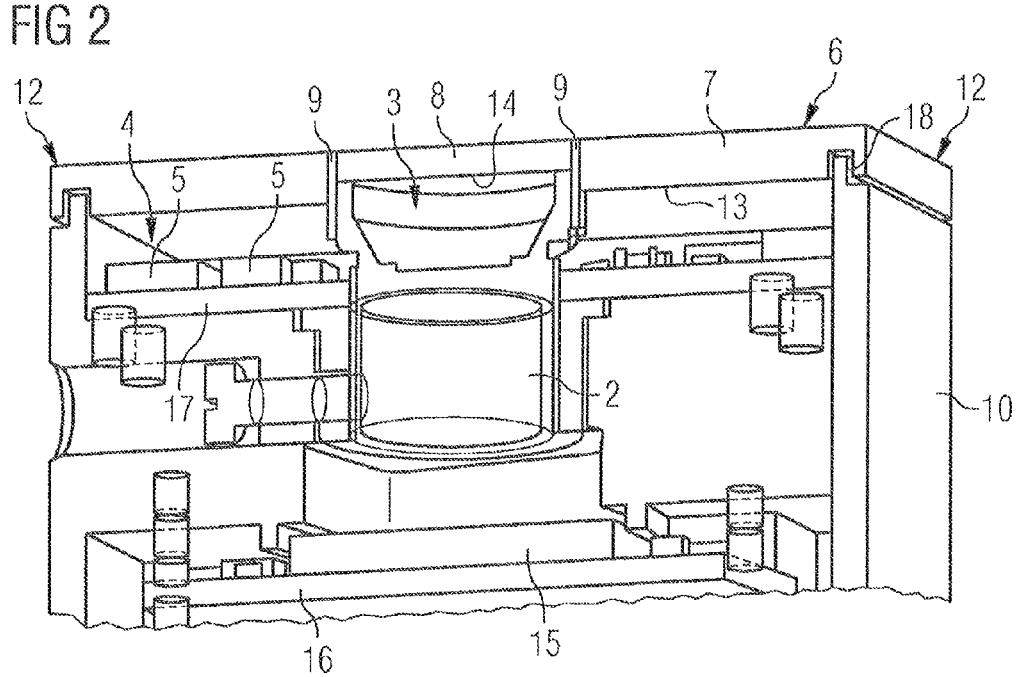

ated into a vehicle design in an optically pleasing fashion.
OPTICAL MODULE WITH INTEGRATED SOURCE OF LIGHT

BACKGROUND OF THE INVENTION

Field of the Invention

This invention relates to an optical module with a lens arrangement for the projection of electromagnetic radiation to an image sensor and with a source of light arranged in the surrounding area of the radiation inlet area of the lens arrangement, whereby the lens arrangement and the source of light are provided with a cover permeable to the electromagnetic radiation, whereby the cover is provided with a radiation barriers which is impermeable to radiation emitted by the source of light and prevents a direct injection of radiation emitted by the source of light into the lens arrangement.

Such an optical module is described in DE 103 60 762 A1.

A generic optical module is employed especially in the motor vehicle industry. In this way, optical modules are used in camera-based systems in order to increase comfort as well as as driver assistance systems. Some systems need a source of light, which predominantly emits electromagnetic radiation within the infrared range in order to be able to monitor and evaluate the surrounding area. The surrounding area to be observed can be the interior of a motor vehicle for example, e.g. for occupant detection or the observation of driver reactions.

The source of light used for a camera system of the aforementioned type is frequently accommodated in a housing which differs from that of the camera and is arranged in spatial proximity to the camera. This procedure is disadvantageous due to high costs involved in installation in a vehicle. An electrical connection is necessary between the camera and the source of light in order to be able to operate the source of light in synchrony with the camera.

Arrangements are also known, in which the source of light is arranged In a housing which differs from that of the camera.

WO 03/105465 A1 discloses an optical module, in which light emitting diodes (LEDs) are arranged in the surrounding area of the radiation inlet area of the lens arrangement, so that the optical module is also able to operate in poor lighting conditions. The light emitting diodes are arranged in a ring-shaped fashion around the lens arrangement, whereby the axes of the light emitting diodes include alternately different angles with the axis of the module. A diffuse illumination should herewith be achieved in order to realize an even illumination of the objects to be captured optically. To avoid unwanted optical effects, particularly due to a lateral incidence of light, provision is made for optical density or the utilization of total reflectance.

BRIEF SUMMARY OF THE INVENTION

The object underlying the invention is to provide a generic optical module which is simple and cost-effective to assemble and produces a reliable optical quality.

This object is achieved with an optical module having the features of claim 1. Advantageous embodiments result from the dependent claims.

With a generic optical module according to invention, the lens arrangement and the source of light are provided with a cover which is permeable to the electromagnetic radiation, whereby the cover is provided with a radiation barrier which is impermeable to the radiation emitted by the source of light and prevents a direct injection of the radiation emitted by the source of light into the lens arrangement.

This herewith ensures that the electromagnetic radiation emitted by the source of light is not able to reach the radiation inlet area of the lens arrangement as scattered light, thereby rendering a significantly improved image quality attainable. The provision of a cover is advantageous in that the optical module is not prone to contamination, and is easily cleanable however in the event of possible contamination. The provision of a cover which is permeable to the electromagnetic radiation emitted by the source of light as well as to the electromagnetic radiation captured by the lens arrangement is further advantageous in that the optical module can be integrated into a vehicle design in an optically pleasing fashion.

The radiation barrier can thereby consist of any material, which blocks the electromagnetic radiation emitted by the source of light. The radiation barrier can be manufactured from plastic for example, which is provided with a suitable additive, e.g. carbon black, in order to block this electromagnetic radiation. In principle, metal would also be a suitable material for the radiation barrier.

The radiation barrier is integrated into the cover in such a manner that light fed into the cover is not able to reach the transverse direction toward the radiation inlet area.

In a preferred embodiment, provision is thus also made for the radiation barrier to be arranged circumferentially to the radiation inlet area of the lens arrangement. This herewith ensures that no scattered light can reach the radiation inlet area through the cover.

It is further preferred, if the radiation barrier is designed such that it is adjacent to a lens holder of the lens arrangement. This embodiment also exhibits the above-mentioned advantage in that the penetration of scattered light through or past the cover into the radiation inlet area is prevented.

A further expedient embodiment provides for the radiation barrier to be connected to the cover in a form-fit fashion. This herewith results in a particularly simple assembly of the optical module, since a semi-finished product can be prefabricated from the cover and radiation barrier, so that only the semi-finished product remains to be suitably connected to a housing of the optical module. It is herewith particularly preferable if the radiation barrier and the cover are designed in one piece. This can take place for example within the scope of a two-component injection molding process. The material forming the radiation barrier is hereby permeable to electromagnetic radiation emitted by the source of light and received by the lens arrangement. However the material of the radiation barrier is impermeable to these wavelengths. This manufacturing process furthermore ensures that the penetration of scattered light into the cover is definitely ruled out.

A further embodiment provides for the cover to feature a structuring at least on its side facing toward the source of light and/or lens arrangement.

In accordance with a further embodiment, provision is made for the structuring to feature a form which guides the beam path of the electromagnetic radiation. The structuring can thereby influence the angle of radiation of the source of light. In this way it is possible, with a particular advantage, to attach the light source and semiconductor element onto one or several common brackets, so that they firstly exhibit parallel optical axes.

To achieve a diffuse illumination for an even illumination of the objects to be captured, the structuring guides a part of the electromagnetic radiation in different directions. The structuring within the radiation inlet area can accordingly adopt the function of an additional lens in the lens arrangement. The provision of the structuring thus enables the optical characteristics to be influenced in a design-specific fashion.

To obtain an optically even surface of the cover and thus of the optical module, the structuring is preferably provided on the side facing toward the source of light and/or the lens arrangement. Provided it is necessary, for functionality reasons, such a structuring can additionally be provided on the exterior of the cover. It would also be conceivable to provide a described structuring exclusively on the exterior of the cover, with the structuring then being designed in such a way that it does not disadvantageously influence the beam path of the module.

In accordance with a further embodiment, the cover exhibits an even or homogeneous smooth surface on its side facing away from the source of light and the lens arrangement. In addition to an improved optical characteristic of the optical module, low dirt susceptibility as well as an improved cleaning possibility also result.

Provision is also made for the source of light to be formed at least partially by one or more light emitting diodes or laser diodes, which at least partially surround the lens arrangement. The arrangement and the selection of the number of light emitting diodes take place according to the requirements given for the illumination. The light emitting diodes can be arranged in a ring-shaped fashion around the lens arrangement, with this however not being mandatory.

Provision is also made for the cover to be connected to a housing of the optical module in a form-fit fashion. This measure ensures that no scattered light can reach between the housing and the cover, which would then reduce the optical characteristics on entry into the radiation inlet area.

It is herewith preferred if the cover, along with the radiation barrier arranged thereupon, is snapped into the housing. This herewith results in a particularly simple assembly. It also ensures that the cover with the radiation barrier arranged thereupon can be easily exchanged, e.g. allowing for a modified surrounding area.

In accordance with a further embodiment, provision is made for the cover to exhibit a different design within region of the lens arrangement, in particular a different cross section than the range of the source of light. The cover of the optical module therefore does not have to be designed homogeneously over its entire surface. The cover can instead be adapted to the requirements of the source of light and/or the lens arrangement, or generally the camera.

The invention is described in more detail below with reference to the figures, in which;

BRIEF DESCRIPTION OF THE SEVERAL VIEWS OF THE DRAWING

FIG. 1 shows a first perspective view of an inventive optical module,

FIG. 2 shows a cross section through the optical module shown in FIG. 1,

DESCRIPTION OF THE INVENTION

Figure 3:
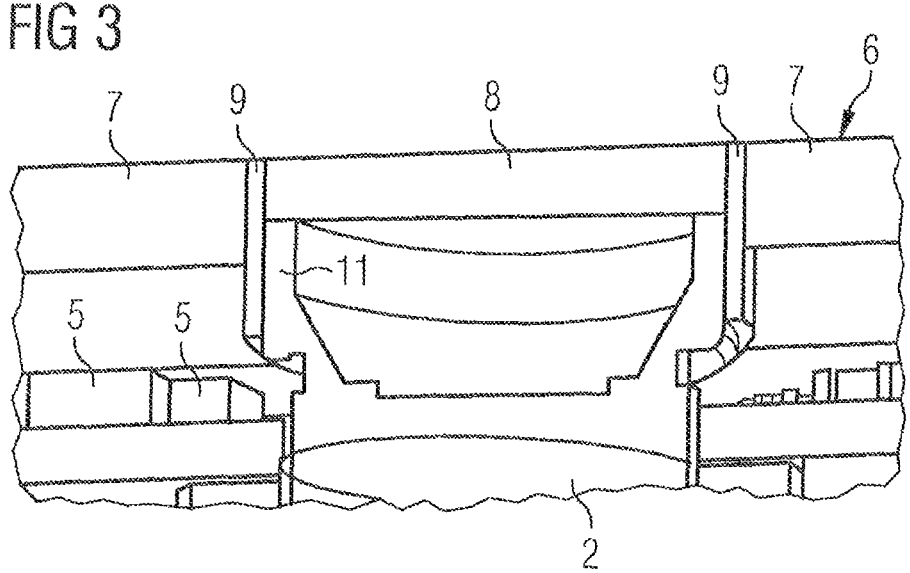
FIG. 3 shows an enlarged cutout of the cross-section in FIG. 2.

FIG. 1 shows a perspective view of an inventive optical module 1. The exact design of the inventive optical module 1 emanates better from FIG. 2, which shows a section through the optical module 1 in accordance with FIG. 1.

The optical module 1 exhibits, in a known manner, a lens arrangement 2 for the projection of electromagnetic radiation to a semiconductor element 15. This unit is also referred to as a camera. The lens arrangement 2 is only shown schematically in the figure. The lens arrangement can feature one or a plurality of separate lenses. The embodiment and arrangement of the lenses to one another can be selected here according to the requirements. The semiconductor element 15 is attached to a bracket and lies in the optical beam path to the lens arrangement.

A source of light 4 in the form of one or several light emitting diodes 5 (LED) is arranged on a further bracket 17 adjacent to a radiation inlet area 3 of the lens arrangement 2. The light emitting diodes 5 can thereby be arranged in a ring-shaped fashion around the radiation inlet area 3. This is however not compulsory; the number and the arrangement of light emitting diodes can, in principle, take place in any fashion provided it is ensured that the surrounding area to be monitored is well illuminated. The light emitting diodes 5 on the bracket 17 are repositioned opposite to the radiation inlet area 3, so that the electromagnetic radiation emitted thereby, preferably in a non-visible region of the light, is not able to directly illuminate into the lens arrangement.

The radiation inlet area 3 is embodied by a lens holder 11, which is arranged concentrically to the beam path of the lens arrangement 2. By virtue of its funnel shape, the lens holder 11 ensures that the image quality received by the semiconductor element is not affected negatively by the electromagnetic radiation, viewed from the side.

A cover 6 which is permeable to the electromagnetic radiation emitted by the light source 4 and to be received by the camera is arranged in front of the lens arrangement 2 and the light source 4. The cover 6 includes a region 7, which covers the source of light and a region 8, which covers the lens arrangement. The regions 7, 8 can be embodied in one piece or two pieces. An optically homogeneous surface is provided by the cover 6, viewed from the exterior (see FIG. 1), with an advantageous optical characteristic of the optical module resulting on the one hand and a low susceptibility to contamination and a simple cleaning possibility resulting on the other hand.

Both the sections 7, 8 of the cover 6 are separated from one another by a radiation barrier 9, so that a light injection is ruled out across the regions 7, 8 of the cover. The radiation barrier 9 is impermeable to the spectrum emitted by the source of light 4 and blocks at least this frequency spectrum as well as the frequency spectrum, in which the semi-conductor element is sensitive. The radiation barrier 9 is preferably realized such that the homogeneous surface is not optically negatively affected viewed from the exterior. The radiation barrier 9 is embodied in such a manner that this can not be recognized or is only recognized with difficulty both in respect of its color and its form.

In principle, the radiation barrier 9 can be made out of any material, provided it is ensured that this is impermeable to electromagnetic radiation in the workspace of the source of light. Plastic or metal materials are preferably suitable.

The radiation barrier 9 can be manufactured as a separate component from the cover 6 and can be connected thereto in a form-fit fashion within the scope of a manufacturing step. It is however also conceivable to manufacture the cover 6 and the radiation barrier 9 as a single unit, which can be realized within the scope a two-component injection molding process for instance.

The semi-finished product comprising a cover 6 and a radiation barrier 9 is measured in respect of its geometrical dimensions in such a manner that the radiation barrier 9 borders the lens holder 11, or rather surrounds it, as shown in FIGS. 2 and 3, in a form-fit fashion. On the other hand, the radiation barrier 9 is continuous up to the outer side of the cover 6, thereby rendering injection of light over the cover 6 in the direction of the radiation inlet area of the camera is practically impossible.

The cover 6 is connected to the housing 10 in the exemplary embodiment by way of a catch mechanism 12. This can be represented, as in FIG. 2, by a circumferential groove 18 provided in the cover 6, into which a correspondingly adjusted section of the housing 10 can be forced.

Figure 4:
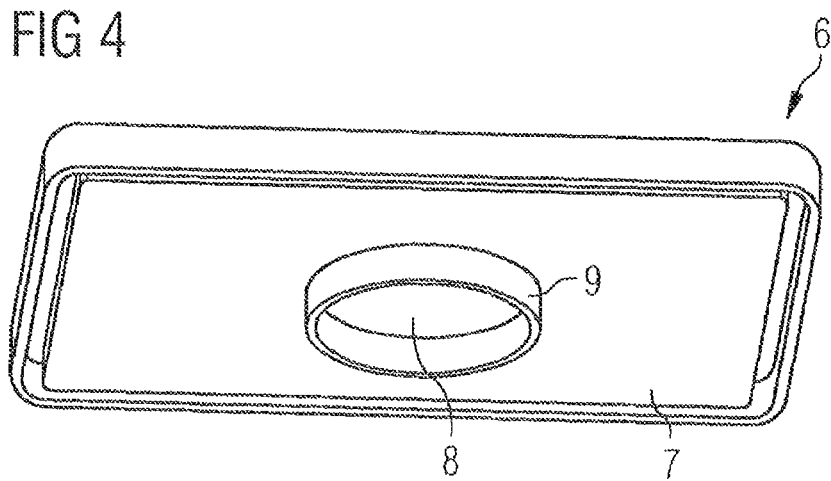
FIG. 4 shows a perspective view of a cover used in the inventive module.

A better illustration of the cover 6 attached to the housing 10 of the optical module is represented in FIG. 4. This figure shows the cover 6 in a perspective view from its rear side 13, 14 i.e. the side, which is assigned to the source of light 4 and the lens arrangement 2. From this representation it is easily recognizable that the radiation barrier 9 is embodied in a ring-shaped fashion and fashion and extends over the rear 13, 14 of the cover 6. The diameter of the radiation barrier 9 is thereby selected in such a manner that this is adjusted to the outside diameter of the lens holder 11 and can be attached thereto using slight pressure (see FIG. 3). This herewith ensures that no scattered light can pass between the radiation barrier 9 and the lens holder 11 toward the radiation inlet area 3.

Figure 5:
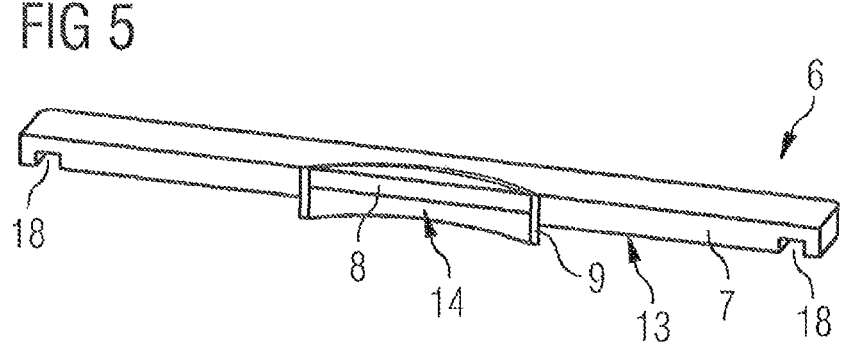
FIG. 5 shows a further perspective view of the cover from FIG. 4, with a sectional view being shown.

From FIG. 5, which shows a section through the cover 6 according to FIG. 4 in a perspective view, it emerges that the radiation barrier extends over the entire thickness of the cover 6. From the figure it is further seen that section 8 of the cover 6, to which the lens arrangement 2 is assigned, exhibits a different cross section 5 to that of the section 7 of the cover 6. The sections 7, 8 of the cover 6 can be adapted here to the respective requirements of the camera and/or the source of light. It is especially conceivable to provide the section 7 of the cover 6 with a sectioned structuring, which guides e.g. the beam path of the electromagnetic radiation emitted by the source of light into a desired area. Likewise, the structuring of the section 8 can be embodied in such a manner that this section adopts an optical function in terms of the lens.

The structuring is preferably provided solely on the rear side 13, 14 of the cover 6, so that the optical characteristic, which is essentially determined by the front side of the cover 6, is not negatively affected for the viewer.

It is preferred that if the optical module is operated such that the source of light is synchronized with the camera, i.e. an illumination of the environment only takes place if an image is recorded by the camera (more precisely by the semiconductor element). This herewith ensures that no heat problem results from the source of light, as would be the case during continuous illumination.

The present invention provides an optical module for a driver assistance system, which can be integrated in a motor vehicle in an inconspicuous fashion and enables the images recorded by the camera to be of good quality.

The invention claimed is:

1. An optical module, comprising:
   a semiconductor element forming an image sensor;
   a lens arrangement for projecting electromagnetic radiation onto said image sensor, said lens arrangement having a radiation inlet area;
   a light source disposed within a surrounding area of said radiation inlet area of said lens arrangement;
   a cover enclosing said lens arrangement and said light source, said cover being permeable to the electromagnetic radiation;
   a radiation barrier integrated into said cover, said radiation barrier being impermeable to radiation emitted by said light source and being disposed to prevent direct injection of radiation emitted by said light source into said lens arrangement and to prevent light injected into said cover from entering said radiation inlet area in a transverse direction.

2. The optical module according to claim 1, wherein said radiation barrier is disposed circumferentially about said radiation inlet area of said lens arrangement.

3. The optical module according to claim 1, wherein said lens arrangement includes a lens holder and said radiation barrier is configured to border said lens holder.

4. The optical module according to claim 1, wherein said radiation barrier is connected to said cover in a form-fit.

5. The optical module according to claim 1, wherein said radiation barrier and said cover are integrally formed in one piece.

6. The optical module according to claim 1, wherein said cover is formed with a structuring at least on a side thereof facing at least one of said light source and said lens arrangement.

7. The optical module according to claim 6, wherein said structuring is formed to guide a beam path of the electromagnetic radiation.

8. The optical module according to claim 1, wherein said cover is formed with an even or homogonously flat surface on a side thereof facing away from at least one of said light source and said lens arrangement.

9. The optical module according to claim 1, wherein said light source is one or more diodes at least partly surrounding said lens arrangement.

10. The optical module according to claim 9, wherein said diodes are light emitting diodes or laser diodes.

11. The optical module according to claim 1, wherein said cover is connected to a housing of the optical module in a form-fit.

12. The optical module according to claim 1, wherein further comprises a housing, and said cover, together with said radiation barrier, is snapped into said housing.

13. The optical module according to claim 1, wherein said cover has a different configuration in a region of said lens arrangement than within a region of said light source.

14. The optical module according to claim 13, wherein said cover has a different cross section in the region of said lens arrangement than within the region of said light source.

* * * * *